Patented Mar. 4, 1941

2,234,080

UNITED STATES PATENT OFFICE 2,234,080

CEMENT COMPRISING MAGNESIA AND COPPER CHLORIDE AND ARTICLES MADE THEREFROM

Thomas A. Mitchell and Donald C. Mitchell, Torrance, Calif., assignors to Palos Verdes Laboratories Corporation, Torrance, Calif., a corporation of California No Drawing. Application March 16, 1938, Serial No. 196,154

14 Claims. (Cl. 106—29)

This invention relates to cements and to methods of employing the same, and more particularly to cement mixtures capable of being plasticized and hardened in position which have fungicidal or other desired properties and to articles and coated bodies formed therefrom.

Sorel cement, which is commonly used in many industries, is made by combining magnesium oxide with a magnesium chloride solution, and the resultant magnesium oxychloride has many valuable properties, such as high strength and the capability of adhering strongly to other bodies. This type of cement, however, has certain disadvantages which limits its use materially. It is found, for example, that it disintegrates gradually when it stands in the presence of water, and this action is believed to be due to hydrolysis of the magnesium oxychloride wherein the cement gradually changes to form magnesium chloride which dissolves in the water and causes the cement to weaken and break up. It, moreover, is not desirable to use such a cement in contact with lime bearing materials and particularly in the presence of water, due presumably to the hydrolysis of components of the cement and reaction with the lime.

One object of this invention is to provide a cement using magnesia as a primary raw constituent and which possesses desirable properties of magnesium oxychloride cement without the undesirable characteristics above specified, and which is in particular a very strong and durable cement and may be used in the presence of water and, in fact, is particularly useful for lining aqueducts, reservoirs and water pipe lines.

It is found that aqueducts tend to become coated with fungi, and the result may be a very bad taste in the water or its impairment for human usage. On the other hand, it is highly desirable that a large aqueduct for supplying a city with water be made of a cement or have a cement lining, owing to the economy in construction and maintenance and to the general flexibility of use of a cement as compared with metal, wood or other materials. However, Portland or hydraulic cement is so constituted that fungus growth occurs readily on its surface and the comparatively porous material presents many problems from the sanitary viewpoint.

Other objects of this invention are, therefore, to provide a method of protecting the walls of reservoirs, pipe lines, etc., from fungus growth and to furnish therefor a cement having fungicidal properties which may be used directly for making conduits or containers or applied as a lining to cement, metal, wood or other construction materials employed for such purposes, and which will form a satisfactory surface capable of resisting disintegration or solution in water and remain substantially stable and unchanged during a long life of useful service.

A further object of the invention is to provide a cement of general utility which may be molded as a plastic and then hardened in a desired shape or which may be applied as a coating on many types of articles made of various materials for the purpose of improving the appearance, durability and life of service or otherwise imparting utility or artistic qualities thereto.

Another object is to form various types of articles from such cements, as by coating a shaped body therewith or by molding an article directly from the cement or intermixtures thereof with granular or other materials. Further objects will be apparent in view of the following disclosure.

In accordance with our invention, we have provided a method of protecting various types of reservoirs, dams, walls, conduits and other water containers from fungus growth by making the water exposed surface of magnesia cement containing a fungicide, such as a chlorine compound of copper. We also have provided a cement of general utility which is made of magnesium oxide and copper chloride, with or without the chloride or a chlorine compound of a metal other than magnesium, and particularly iron, barium, cadmium, chromium, cobalt, manganese, nickel, tin, zinc, or those metals whose oxychlorides are insoluble in water or which can react with magnesia in the presence of water to form a hard and substantially insoluble product that will not be materially hydrolyzed and disintegrated by water. We may also use mixtures of two or more of these various compounds. This cement may be combined with silica in suitable granular condition and amount and the parts proportioned as required for making a durable cement of necessary characteristics. Various inert fillers and granular materials and coloring matter may also be used, and molded bodies made from intermixtures thereof with our cement.

In order to illustrate the breadth of the invention without limiting it to the formulas specified, the following compositions are to be noted as being satisfactory for the specified purposes. The tables given only the dry ingredients, and water is to be added in amount required to form a plastic mass capable of being applied in the desired locality and to cause the necessary reactions and the cement to set to its final hard condition.

*MgO-CuCl₂-SiO₂ fungicidal cement*

| | Per cent by weight |
|---|---|
| Magnesia | 20 |
| Cupric chloride | 20 |
| Silica | 60 |

*MgO-CuCl₂-SiO₂ lining cement for concrete pipes*

| | Parts by weight |
|---|---|
| Calcined magnesite | 20 |
| Cupric chloride | 20 |
| Silica 300 grit side | 50 |
| Silica, 40 grit | 10 |

*MgO-CuCl₂-SiO₂ coating for steel and wood*

| | Parts |
|---|---|
| Magnesia | 30 |
| Cupric chloride | 30 |
| Silica | 40 |

*MgO-CrCl₃-CuCl₂-SiO₂ cement*

| | Parts |
|---|---|
| Magnesia | 20 |
| Chromic chloride | 5 |
| Copper chloride | 15 |
| Silica | 60 |

*MgO-CuCl₂-FeCl₃-SiO₂ cement*

| | Parts |
|---|---|
| Magnesia | 25 |
| Cupric chloride | 10 |
| Ferric chloride | 5 |
| Silica sand | 60 |

*MgO-CuCl₂-FeO-SiO₂*

| | Per cent by weight |
|---|---|
| Magnesia | 20 |
| Cupric chloride | 20 |
| Black oxide of iron | 20 |
| Silica—300 frit | 40 |

*MgO-CuCl₂-Fe₂O₃-SiO₂*

| | Per cent by weight |
|---|---|
| Magnesia | 20 |
| Copper chloride | 15 |
| Red oxide of iron | 5 |
| Silica—fine | 40 |
| Silica—coarse | 20 |

In the above tables, the various salts used are the ordinary standard materials of commerce and may contain water of crystallization. For example, copper chloride is ordinarily marketed as CuCl₂.2H₂O. The proportioning of the ingredients may take this into account, although the relative amounts may be widely varied. It is preferred, however, to have an excess of magnesia over the amount of metal chloride used, so as to take up all of the water soluble metal chloride reagent employed, and ordinarily we prefer to use from 15 to 60% by weight of magnesia in these cements. Moreover, if the metals of the chlorides have more than one valence, we prefer to use the compound of the higher valence, such as cupric or ferric chloride. These give cements of greater hardness and strength than do the -ous chlorides.

It is also feasible and within the scope of our invention to employ copper sulfate and to form the metal chloride in position; and in this case we prefer to add a reagent, such as barium chloride, which reacts to form the chloride of the reagent material and barium sulfate within the cement. An example of this type of cement is as follows:

*Barium sulfate cement*

| | Parts by weight |
|---|---|
| BaCl₂.2H₂O | 10 |
| Blue vitriol (CuSO₄.5H₂O) | 10 |
| Calcined magnesite | 15 |

The precipitated barium sulfate is insoluble in water and serves in the place of silica found in the first set of tables, but silica may also be added to give desired properties.

The silica, if used, appears to serve in some bonding capacity and so is not merely an inert material. Various other materials, such as crushed rock or silicate sands, may be substituted for or used with the silica as desired. The amount of the silica may be so proportioned that the coefficient of expansion of the cement will match that of its support. Also, it is often desirable to mix, as by ball milling, the metal chloride with the silica or other material used before the magnesia is added, and especially when cupric chloride with water of crystallization is employed, so as to get a positively dry mixture.

We may also add a metallic powder, such as the metal of any of the reagent metal chlorides used, in order to have an active reagent present which is capable of combining with any free chloride solution that might be developed within the cement body. Copper metal is preferred, since its reaction product is fungicidal and it forms a hard insoluble compound. An example of this is:

| | Parts |
|---|---|
| Calcined magnesite | 20 |
| Copper chloride | 20 |
| Silica | 50 |
| Metallic copper particles | 3 |

Similarly, one might add 5 parts of chrome nickel powder or 5 parts of metallic iron, or 6 parts of metallic zinc dust to any of the cements of the above tables. That is, one may add any of the metals of the chlorides above listed in any desired proportions to any one of the cements, such as metallic nickel to a copper chloride cement, or metallic iron to a MgO copper chloride cement comprising chromium chloride. Various other metallic powders may be added, such as ferro-chrome, ferro-nickel chrome and bronze powders of the type now used in metallic paints for coating radiators and the like. The metal tends to react with the ingredients of the cement in the presence of air to form an oxygen compound, such as copper oxychloride and to produce the glaze like coating that may be desired. It may be also noted that the lower valence salts, such as cuprous chloride, may be employed with the metal oxide, such as copper oxide, or with the metal, such as copper metal.

In order to make a glossy or smooth surface, one suitable method comprises heating copper chloride either before or after its mixture with the silica to a temperature at which it will lose some 5% or more of its chlorine content with the formation of copper oxide or copper oxychloride intermixed with the anhydrous copper chloride. This copper oxygen compound has the faculty of providing a hard, durable and glossy surface. This procedure may be employed with the various copper chloride cement mixtures above specified for the purpose of providing a surface of finer porosity or a glaze like coating. Such a cement may also be modified by the addition of desired metals and oxides. For example, a cement comprising the heated copper chloride may have copper metal or copper oxide added thereto or an intermixture thereof. Copper scale is particularly useful for the purpose of making a glossy surface. This glossy cement mixture may be sprayed on to wood, asphalt, shingles, tar coated products and many other types of material which are exposed to water and require protection therefrom.

The cement ingredients may be mixed in any suitable manner, but it is preferred that the magnesia and the reagent metal chloride be mixed in a dry condition with or without the silica. Then when the cement is to be applied on the job the two reagents are mixed with the silica, if used, and with water in amount to make a plastic mass. This material may be troweled or painted or sprayed onto the surface to be coated or it may be molded or otherwise shaped to form an article of required dimensions. As soon as the material has been wet with water, the process of hardening begins and in the course of twenty-four hours it has set permanently. It is found that the strength increases with time and it is often desirable to allow the material to set for 1 or 2 weeks before it is used.

It is found that the quantity of water employed in the cement is of primary importance as regards the tensile strength of the product. For example, if a cement mixture is made of equal parts of magnesia and copper chloride, it is found that 20% by weight of water will give a higher tensile strength, after the material has been allowed to set for two weeks and exposed to ordinary weather conditions, than will larger amounts of water. Hence, for certain uses we prefer that the water content be not greater than 30% and preferably in the vicinity of 20% or somewhat lower, as may be desired. The smaller quantities of water permit the material to set more quickly and to form a compact and coherent mass of greater tensile strength than is the case when larger amounts of water are used. Ordinarily, we use only so much water in the cement as is needed for causing the necessary chemical reactions and the material to set to its hard and final permanent condition.

This cement is so much stronger than Portland cement that it materially reinforces the body to which it is applied. For example, a Portland cement mixture of two parts of cement, three of sand and five of gravel was found to have a tensile strength of about nineteen hundred pounds per square inch. If a concrete aqueduct made of that material is coated with a cement made of equal parts of magnesia and copper chloride, which is plasticized by means of approximately 20% by weight of water, it is found that this coating has a tensile strength of at least twice that of the Portland cement. Moreover, such a coating cement, especially if heat treated to form a glaze surface, may provide a surface that is highly waterproof. A considerable amount of coarse sand may be incorporated in such a cement without reducing the tensile strength to a point below that of the Portland cement body on which it is coated. The use of the finely divided silica sand will insure greater strength as well as lesser permeability to water. Such a cement is also resistant to erosion as well as possessing fungicidal properties.

These various compounds may be used in all sorts of ways. For example, one may coat a pottery flower pot, which has a dead burned rough surface and no glaze, by dipping or spraying it with various mixtures above mentioned, and a desired imitation glaze of a required color may be applied. This treatment also applies to building bricks, fire bricks, adobe and other materials. By mixing in a suitable coloring, such as ferric oxide to produce a reddish color, the cement may be given the required artistic appearance. Also, one may make an imitation marble finish for buildings and in that case different color materials will be used as needed. This cement will adhere very strongly to both metal, wood, cement, brick and other material. This cement is also useful for coating the steel work of buildings which are to be protected against the weather and various chemical reactions incident thereto. It may be coated on cast iron ware, such as kitchen sinks, bathtubs and other household appliances. It is especially useful for providing a glossy finish for walls of houses made of brick, tile, etc., such as may be desired in the bathroom or a kitchen.

Any of the above described cements may be used in particular as a bond for abrasive grains, such as silicon carbide and crystalline alumina, to form a grinding wheel or other abrasive article. In that case, the sizes of the grains may be varied as desired, and the relative amounts of grains and cement will be selected to give the required porosity and grade of hardness or bond strength for the wheel. A cemented abrasive structure of this type is especially useful as a disk wheel shaped and mounted on a rotatable metal or wood backing for grinding on one side face thereof. This wheel possesses the advantage of being capable of use in the presence of water or aqueous grinding compound used to cool the work or lubricate the grinding operation. Similarly, one may bond gravel or aggregates and form building blocks and other structures therewith. Various other types of granular material may be bonded therewith.

While it is not yet known as to what are the chemical reactions within the cement, it is thought that the chlorides are gradually oxidized to magnesium oxychloride and a complex copper oxychloride or other equivalent chemical compound. There is presumably some combination between the magnesium and the copper compounds which prevents hydrolysis of the magnesium oxychloride and the resultant formation of the soluble magnesium chloride. It may also be observed that we preferably use an excess of magnesia, so that any magnesium chloride that might be formed by hydrolysis would immediately react with the magnesia to form a further amount of magnesium oxychloride. Whatever may be the chemical reactions, it is evident that there is no material disintegration of the cement in the presence of water, and therein lies the great utility of the cement mixture.

We claim:

1. A cement comprising a water reacted mixture of magnesia, copper chloride and a substance of the group consisting of the oxides of the metals copper, iron, barium, cadmium, chromium, cobalt, manganese, nickel, tin and zinc and mixtures thereof, wherein the magnesia and copper chloride are proportioned to set in the presence of water as a hard and substantially insoluble body.

2. A cement comprising magnesia constituting at least 15% by weight of the mass together with a granular material and a reagent substantially free from magnesium chloride which comprises copper chloride sufficient to react with substantially all of said amount of magnesia in the presence of water and set as a hard cement that is not materially disintegrated by water.

3. A cement comprising as the chief ingredients magnesia constituting at least 15% by weight of the mass together with silica and copper chloride proportioned to react with substantially all of said magnesia in the presence of water and set as a hard cement that is not materially disintegrated by water, said cement being substantially free from magnesium chloride.

4. A cement comprising a mixture of magnesia, copper chloride and the chloride of a metal other than magnesium whose oxychloride is insoluble in water, the chlorides being proportioned to react with substantially all of the magnesia and set in the presence of water as a hard water resistant cement.

5. A cement comprising essentially magnesia and silica, together with copper chloride and the chloride of a metal other than magnesium whose oxychloride is insoluble in water, the metal chlorides being present in amount sufficient to react with substantially all of the magnesia in the presence of water and form a hard water resistant body.

6. A cement comprising essentially magnesia and copper chloride proportioned to react in the presence of water and set as a hard cement and comprising a metal of the group consisting of copper, iron, barium, cadmium, chromium, cobalt, manganese, nickel, tin and zinc and mixtures thereof, the metal being capable of and present in amount sufficient to react with any available water soluble metal chloride during use of the cement and form an insoluble compound therewith.

7. A cement comprising essentially magnesia and granular silica together with copper chloride proportioned to react in the presence of water with substantially all of the magnesia and form a hard cement and comprising a metal of the group consisting of copper, iron, barium, cadmium, chromium, cobalt, manganese, nickel and zinc and mixtures thereof, said metal being capable of and present in amount sufficient to react with any available water soluble metal chloride during use of the cement and form an insoluble compound therewith.

8. A cement comprising primarily a mixture of magnesia and copper chloride constituting the chief cementing ingredients and proportioned to set in the presence of water as a body that is substantially insoluble in and not disintegrated by water and containing a substance selected from the group consisting of copper metal and its oxides.

9. As an article of manufacture, a body of granular material forming the major proportion thereof which is bonded as an integral structure by a cement comprising as its chief ingredients magnesia and copper chloride in which the latter is proportioned to react in the presence of water with substantially all of the magnesia and set as a hard mass which is not disintegrated by water.

10. As an article of manufacture, a body of granular material forming the major proportion thereof which is bonded as an integral structure by a cement comprising as its chief ingredients magnesia, silica and copper chloride which are so proportioned that the copper chloride reacts with substantially all of the magnesia in the presence of water to form a hard mass which is not disintegrated by water.

11. As an article of manufacture, a wall of Portland cement forming a base structure and a coating thereon of a fungicidal cement formed of the reaction product of a mixture comprising magnesia and copper chloride constituting the primary ingredients thereof which are proportioned to set with water as a substantially hard mass which is not easily disintegrated.

12. An article of manufacture comprising a wall of Portland cement having a coating thereon of a water reacted mixture comprising magnesia, silica and copper chloride in which the latter is proportioned to react with substantially all of the magnesia present and form a hard body that is not disintegrated by water.

13. As an article of manufacture, a mass formed of the reaction product of a mixture of ingredients comprising essentially magnesia and copper chloride in which the copper chloride is present in amount sufficient to react with substantially all of the magnesia in the presence of water and set as a hard mass, said article containing a copper oxygen compound and having a glazed surface which is highly resistant to water.

14. As an article of manufacture, a mass formed of the reaction product of a mixture of ingredients comprising essentially magnesia and silica together with copper chloride proportioned to react with substantially all of the magnesia in the presence of water and set as a hard mass, said article containing a copper oxygen compound and having a glazed surface which is highly resistant to water.

THOMAS A. MITCHELL.
DONALD C. MITCHELL.